March 28, 1967     D. H. PEDERSEN     3,311,208
MOUNTING MEANS FOR MAGAZINE SUPPLY IN EMBOSSING TOOLS
Filed June 7, 1965
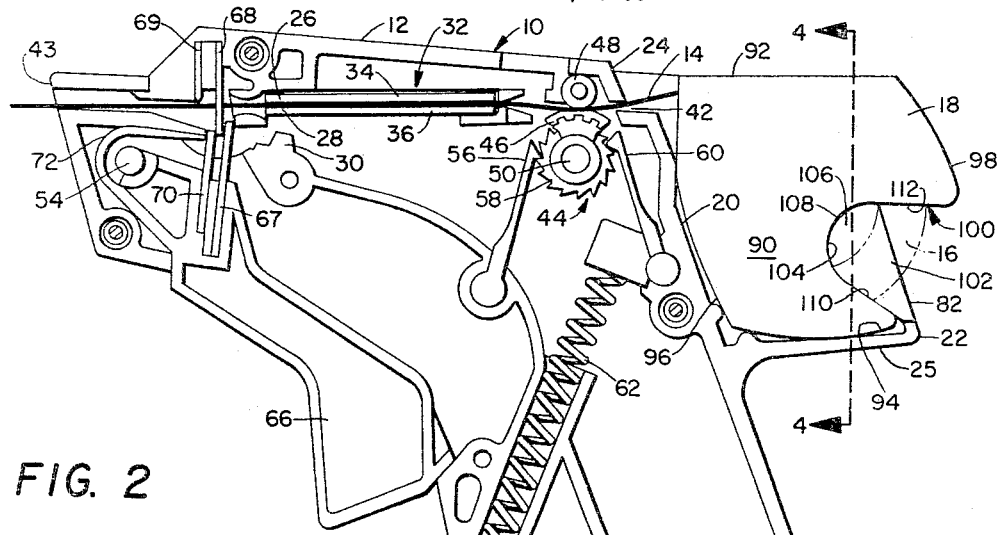
FIG. 2
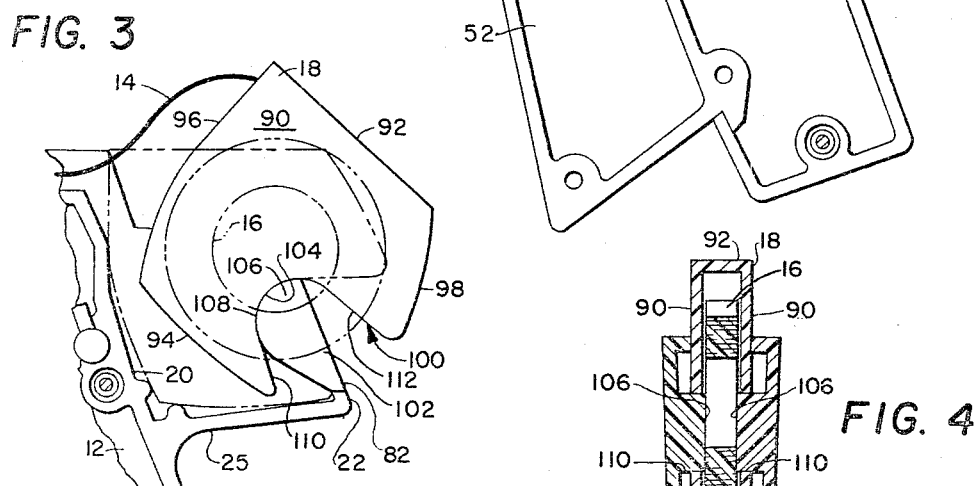
FIG. 3
FIG. 4
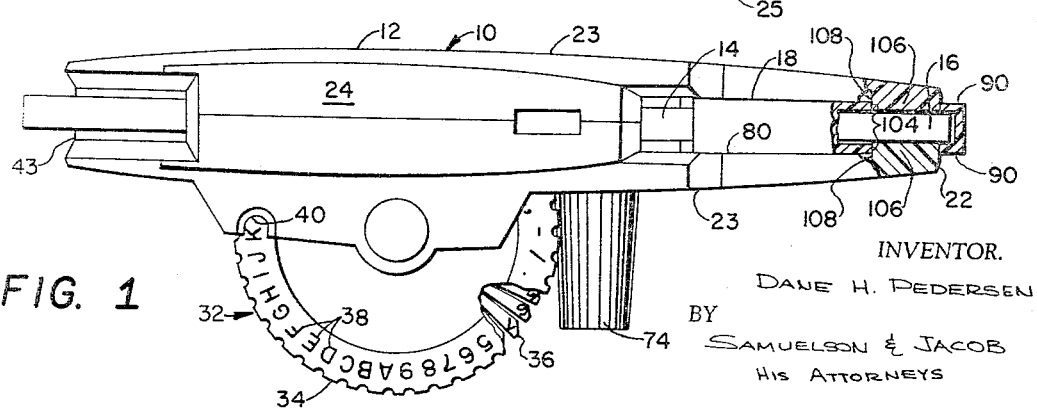
FIG. 1
INVENTOR.
DANE H. PEDERSEN
BY
SAMUELSON & JACOB
HIS ATTORNEYS

United States Patent Office 3,311,208
Patented Mar. 28, 1967

3,311,208
MOUNTING MEANS FOR MAGAZINE SUPPLY IN EMBOSSING TOOLS
Dane H. Pedersen, Moraga, Calif., assignor to Dymo Industries, Inc., Emeryville, Calif., a corporation of California
Filed June 7, 1965, Ser. No. 461,751
4 Claims. (Cl. 197—6.7)

The invention relates generally to embossing tools for embossing strip material which is supplied to the tool in a magazine and pertains, more specifically, to means for accurately locating and positively securing such magazines within the tools.

A variety of embossing tools are presently available for establishing embossments in strips of embossable material in the fabrication of labels, signs, plates, tags, and the like. More recently, such tools have been developed for embossing various indicia on thin plastic strips formed of sheeted thermoplastic resins which are capable of being cold-formed to establish a contrast color relief enfigurement therein. Usually, the tools employ embossing means for establishing the desired embossments, a supply of strip material and means for feeding the strip material from the supply to the embossing means. Often, the strip material is supplied from a magazine placed in the body of the tool. The strip material is usually in the form of an elongated flexible tape having a constant, closely controlled width.

The smooth, reliable operation of the tool requires that the strip material be readily fed from the supply by the feed means. Thus, the registry and securement of a magazine supply within the body of the tool becomes an important factor in the overall performance of the tool. At the same time, proper registry and securement of a magazine supply should be accomplished without sacrificing the ease of insertion and removal of magazines.

It is therefore an object of the invention to provide means in an embossing tool for locating and securing a magazine supply of embossable material within the body of the tool.

Another object of the invention is to provide an embossing tool having means for locating and securing a magazine supply of embossable material within the body of the tool and a magazine having means for cooperatively engaging the locating and securing means when the magazine is in place in the body of the tool.

A further object of the invention is to provide means for locating and securing a magazine supply of embossable material within the body of an embossing tool, the means allowing ready insertion and removal of the magazine to assure ease of interchange-ability of magazines along with their respective supplies.

A still further object of the invention is to provide as an improvement in embossing tools, means for locating and securing a magazine supply within the body of the tool, the means requiring a minimum departure in the structural arrangement of the tool and magazine combination from that of currently available tools and magazines yet providing the requisite effectiveness.

The invention may be described briefly as an improvement in a tool for embossing strip material wherein a strip of embossable material is advanced along a fixed path through the body of the tool from a magazine strip supply located in a socket in the body toward embossing means in the body, the magazine including at least one slot extending from an open mouth to an arcuate root, the improvement comprising at least one protuberance extending from the body into the socket and having an arcuate shoulder complementary to the root for passing through the mouth and being seated at the root for cooperatively engaging the slot to locate and secure the magazine within the socket, the socket having a configuration complementary to the configuration of the magazine and the magazine being rotatable between an intermediate position wherein threading of the strip material into the body is facilitated and a final operating position while secured within the body with the protuberance being seated at the root in each of the intermediate and final positions.

The invention will be more fully understood and further objects and advantages thereof will become apparent in the following detailed description of an embodiment of the invention illustrated in the accompanying drawings, in which:

FIGURE 1 is a top plan view, partially sectioned, of a tool and magazine constructed in accordance with the invention;

FIGURE 2 is a side elevational cross-sectional view of the tool illustrating the internal construction thereof;

FIGURE 3 is a fragmentary side elevational view illustrating the placement of a magazine in the body of the tool; and FIGURE 4 is a cross-section taken along line 4—4 of FIGURE 2.

Referring to the drawings, a hand operated embossing tool is indicated generally at 10 in FIGURES 1 and 2. Tool 10 has a body or housing 12 which has a general configuration adapted to make the tool easily operated while being held in one hand. The tool is designed to emboss selected indicia in an elongated strip of embossable material such as the variety of thermoplastic resins currently available in the form of plastic tape. As seen in FIGURE 1 and in phantom in FIGURE 2, an embossable tape 14 is supplied in the form of a roll 16, the roll being placed within a tape magazine 18 received within a socket 20 located at one end 22 of the body of the tool. Tool 10 has opposite sides 23, a top 24 and a bottom 25.

Embossing of the tape 14 is accomplished at an embossing station 26 wherein there is located embossing means shown in the form of an embossing die set 28 actuated by a reciprocating actuating member 30. Die set 28 is one of a series of die sets located in the periphery of selector wheel 32 which is rotatably mounted in housing 12 so that any one of the series of die sets can be located at the embossing station 26 to emboss selected indicia in the tape 14. Selector wheel 32 is made up of upper and lower disks 34 and 36, respectively, one of which carries the die and the other of which carries the punch of each die set. As seen in FIGURE 1, the upper disk 34 is provided with visible characters 38 on the outer face thereof corresponding to the indicia which can be embossed by the selectable die sets. The visible characters are also located along the periphery of the selector wheel, but are circumferentially displaced from their corresponding die sets so that when a particular die set is located at the embossing station 26, the corresponding visible character is located at a selector slot 40 provided in the housing 12.

Tape 14 is fed from supply roll 16 through an aperture 42 in housing 12 toward an opposite end 43 of the housing and toward the embossing station 26 by feed means 44 comprising a feed roll 46 which frictionally grips the tape where an idler roll 48 presses the tape against the surface of the feed roll and advances the tape in prescribed increments by being rotated in a counterclockwise direction along with shaft 50 upon which roll 46 is mounted, shaft 50 being journaled in the housing, as will be explained hereinafter.

Embossing of tape 14 is accomplished by displacing actuating handle 52, which is pivotally mounted to housing 12 at 54, in a counterclockwise direction to bring actuating member 30 vertically upwardly into contact with a portion of lower disk 36 and continuing such movement until member 30 actuates the die set 28 positioned at the embossing station 26 and an embossment is established in the tape. At the same time, pawl 56 is moved vertically upwardly to engage the next successive tooth of ratchet wheel 58 which is operatively interengaged with feed roll 46 such that rotation of the ratchet wheel will rotate the feed roll. Rotation of ratchet wheel 58 is precluded during the upward movement of pawl 56 by virtue of spring actuated detent means 60 which resiliently engages further teeth of the ratchet wheel. During the counterclockwise displacement of actuating handle 52, helical spring 62 is compressed so that upon completion of the embossing operation and release of actuating handle 52, the handle 52 is urged back to its starting position by spring 62 with a force sufficient to assure that pawl 56 will rotate ratchet wheel 58 in a counterclockwise direction against the deterrent of detent 60 to rotate feed roll 46 and advance tape 14 through the increment necessary to index the tape for a subsequent embossment. Detent 60 further serves to accurately define the desired increment of rotation so that the tape is automatically indexed a length sufficient to accurately locate each successive embossment on the tape.

Upon completion of the particular embossed article, the article may be severed from the tape by the displacement of a second actuating bar 66, which is also mounted for pivotal movement at 54, in a counterclockwise direction. Such displacement will move a shear blade 67 upwardly along a fixed shear plate 68 to sever the tape. Also, if desired, a fixed knife 69 is located above the tape and extends downwardly thereover and an anvil 70 is movable upwardly from below the tape, along with shear blade 67, to cut a tab at the end of the severed article for facilitating the subsequent removal of a backing strip which is generally present as a part of the embossable strip material. A leaf spring 72 will return actuating bar 66, together with shear blade 67 and anvil 70, back to their normal starting positions shown in FIGURE 2. A tape advance knob 74 is operatively connected to shaft 50 for manually advancing tape 14 by rotation thereof whenever it is desired to advance tape 14 without actuating the handle 52.

Magazine 18 is received within the body of the tool 10 through a top opening 80 and a rear opening 82, both adjacent the rear end 22 of the housing 12 and is seated within the socket 20 as shown. Magazine 18 has a pair of opposed side walls 90 interconnected by top wall 92, bottom wall 94, front wall 96 and rear wall 98. An exit in the front wall allows tape 14 to pass therethrough on the way toward the embossing station. A slot 100 is provided in each side wall and has a profile including a mouth 102 at the rear of the magazine and a concave arcuate root 104.

In order to accurately locate and positively secure the magazine in proper position within the socket and thus facilitate the operation of tool 10 by assuring ease of travel of the tape as it is advanced from the supply through the tool, a protuberance 106 projects from at least one inner wall of the socket 20, and preferably protuberances 106 project from opposed inner walls, as best seen in FIGURES 1 and 4, the protuberances extending in a direction generally perpendicular to the planes in which side walls 90 of the magazine and the profile of slots 100 lie. Each protuberance 106 is integral with a side wall of the housing and has a shoulder 108 which is arcuate in shape having a convex form corresponding generally to the concave form of the root 104 of slot 100.

As best seen in FIGURES 2 and 4, magazine 18 is held positively and firmly by the intimate cooperation between shoulders 108 and the profiles of slots 100 when the magazine 18 is located for proper operation within socket 20. Because of the arcuate configuration of these cooperating surfaces, the magazine cannot be inadvertently dislodged and removed from the socket by forces tending to move the magazine upwardly through top opening 80 or rearwardly through rear opening 82. Thus, the magazine is secured in place in the socket; however, the magazine is readily inserted or removed as will now be explained.

Turning now to FIGURE 3, magazine 18 is shown in an intermediate position during either insertion or removal from the socket 20, the inserted position being indicated in phantom. In placing the magazine within the socket, the magazine is tilted so as to bring the lower edge 110 of the slot 100 through the top opening 80 and place the lower edge forward of the protuberances 106. As the lower edge 110 is moved downwardly, the magazine may be rotated in a counterclockwise direction, the rotation being permitted by the arcuate configuration of shoulders 108 and root 104, until the shoulders are seated in the roof of slot 100. This pivotal or rotational movement during insertion assures that the magazine will be properly located as described above while attaining such insertion without placing any significant inwardly directed forces upon the side walls 90 of the magazine, which forces may tend to bend the walls 90 inwardly against the roll 16 with consequent damage to the tape or a hampering of the free passage of the tape from the magazine. Additionally, such inwardly directed forces could cause permanent injury to the magazine itself. Furthermore, the arcuate protuberances and mating slots achieve the desired locking of the magazine within the socket without establishing outwardly directed forces upon the side walls of the socket so that damage to the housing is precluded as a result of insertion and removal of a magazine. Moreover, the described construction requires no relative lateral movement of the mating parts which could give rise to damaging inwardly or outwardly directed forces upon the magazine and tool body, respectively. Removal of the magazine from the socket is accomplished by merely reversing the above described insertion procedure.

It is noted that threading of the tape 14 through aperture 42 in the housing toward the feed means 44 is facilitated by the insertion procedure available in tool 10. Threading may be accomplished when the magazine is in the intermediate position shown in FIGURE 3. At that point, magazine 18 is already held against inadvertent removal from the socket 20 and aperture 42 is still readily accessible for threading tape 14 therethrough. The lower edge 110 of the profile of slot 100 diverges from upper edge 112 of the slot in a direction from the root toward the mouth to ease insertion of the magazine as described above and seating of the arcuate shoulder in the root.

Thus, it will be seen that the invention provides simplified means in embossing tool 10 for locating and securing magazine 16 within the tool without requiring an extensive departure from known constructions in order to accomplish a high degree of effectiveness.

It is understood that the above detailed description of an embodiment of the invention is provided by way of example only. Various details of design and construction may be modified without departing from the true spirit and scope of the invention as defined in the appended claims.

What is claimed is:

1. In combination, a tool for embossing strip material wherein a strip of embossable material is advanced along a fixed path through the body of the tool from a strip supply located in the body toward embossing means in the body, a socket in the body, a magazine containing said supply and received within the socket, said magazine including at least one slot extending from an open mouth to an arcuate root, at least one protuberance extending from the body into said socket and having an arcuate shoulder complementary to said root for passing through said mouth and being seated at said root for cooperatively engaging the root to locate and secure the magazine within the socket, said socket having a configuration complementary to the configuration of the magazine and the magazine being rotatable between an intermediate position wherein threading of the strip material into the body is facilitated and a final operating position while secured within the body with the protuberance being seated at the root in each of the intermediate and final positions.

2. In combination, a tool for embossing strip material wherein a strip of embossable material is advanced along a fixed path through the body of the tool, said body including a top, bottom, opposite sides and first and second ends, embossing means intermediate said ends, feed means between said first end and said embossing means for advancing said strip along said path from said first end toward said second end, a socket in the body adjacent said first end, said socket including an opening in said top, a magazine containing a supply of said strip material and received within said socket, the magazine including opposed side walls capable of being passed through said opening to seat the magazine in the socket, a slot in each side wall, each slot having a profile lying in a plane generally perpendicular to the plane of the advancing strip of material, each said profile extending from a mouth adjacent said first end toward said second end and culminating in a concave, arcuate root, a pair of protuberances projecting into said socket generally perpendicular to the planes of the profiles, each protuberance including a convex arcuate shoulder complementary to a corresponding profile such that the protuberances will be received within the slots as the magazine is passed through said opening and the convex shoulder will cooperatively engage the concave roots to locate and secure the magazine within the socket while enabling the magazine to be pivoted between an intermediate position wherein threading of the strip material into the body is facilitated and a final operating position while secured within the body.

3. In a tool of the class wherein a strip of embossable material is advanced along a fixed path through the body of the tool from a magazine strip supply located in a socket in the body toward embossing means in the body, the magazine including at least one slot extending from an open mouth to an arcuate root, the improvement comprising at least one protuberance extending from the body into the socket and having an arcuate shoulder complementary to said root for passing through said mouth and being seated at said root for cooperatively engaging the root to locate and secure the magazine within the socket, said socket having a configuration complementary to the configuration of the magazine and the magazine being rotatable between an intermediate position wherein threading of the strip material into the body is facilitated and a final operating position while secured within the body with the protuberance being seated at the root in each of the intermediate and final positions.

4. In a tool of the class wherein a strip of embossable material is advanced along a fixed path through the body of the tool from a magazine strip supply located in a socket in the body toward embossing means in the body, the body including a top, bottom opposite sides and first and second ends, the socket including an opening in said top and the magazine including opposed side walls capable of being passed through said opening to seat the magazine in the socket and a slot in each side wall, each slot having a profile lying in a plane generally perpendicular to the plane of the advancing strip of material and extending from a mouth adjacent the first end toward the second end and culminating in a concave, arcuate root, the improvement comprising a pair of protuberances projecting into said socket generally perpendicular to the planes of the profiles, each protuberance including a convex arcuate shoulder complementary to a corresponding profile such that the protuberances will be received within the slots as the magazine is passed through said opening and the convex shoulder will cooperatively engage the concave roots to locate and secure the magazine within the socket while enabling the magazine to be pivoted between an intermediate position wherein threading of the strip material into the body is facilitated and a final operating position while secured within the body.

References Cited by the Examiner
UNITED STATES PATENTS

| | | | |
|---|---|---|---|
| 228,682 | 6/1880 | Rose | 45—57 |
| 2,302,661 | 11/1942 | Benson. | |
| 3,083,807 | 4/1963 | Travaglio | 197—6.7 |
| 3,127,989 | 4/1964 | Travaglio | 206—52 |
| 3,129,800 | 4/1964 | Bogeous | 197—6.7 |
| 3,129,813 | 4/1964 | Norvelle | 206—52 |

ROBERT E. PULFREY, *Primary Examiner.*

E. S. BURR, *Assistant Examiner.*